US 8,151,359 B2

(12) United States Patent
Fontijn et al.

(10) Patent No.: US 8,151,359 B2
(45) Date of Patent: *Apr. 3, 2012

(54) SYSTEM FOR MANAGING PROPRIETARY DATA

(75) Inventors: Wilhelmus Franciscus Johannes Fontijn, Eindhoven (NL); Philip Steven Newton, Eindhoven (NL); Johan Cornelis Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 747 days.

This patent is subject to a terminal disclaimer.

(21) Appl. No.: 12/093,959

(22) PCT Filed: Nov. 2, 2006

(86) PCT No.: PCT/IB2006/054059
§ 371 (c)(1),
(2), (4) Date: May 16, 2008

(87) PCT Pub. No.: WO2007/057805
PCT Pub. Date: May 24, 2007

(65) Prior Publication Data
US 2008/0256604 A1 Oct. 16, 2008

(30) Foreign Application Priority Data
Nov. 17, 2005 (EP) .................... 05110840

(51) Int. Cl.
*G06F 21/00* (2006.01)
(52) U.S. Cl. ................ 726/27; 726/26; 726/28; 726/29; 726/30
(58) Field of Classification Search .................... 726/1–3
See application file for complete search history.

(56) References Cited

U.S. PATENT DOCUMENTS

| 6,678,682 | B1 * | 1/2004 | Jenkins et al. ................... 1/1 |
| 2002/0003886 | A1 | 1/2002 | Hillegass et al. |
| 2002/0104015 | A1 | 8/2002 | Barzilai et al. |
| 2003/0051169 | A1 | 3/2003 | Sprigg et al. |
| 2004/0148514 | A1 | 7/2004 | Fee et al. |
| 2005/0154905 | A1 * | 7/2005 | Kojima et al. ............ 713/193 |
| 2006/0277184 | A1 * | 12/2006 | Faitelson et al. ............. 707/9 |

FOREIGN PATENT DOCUMENTS

| WO | 03017682 A2 | 2/2003 |
| WO | 2005036404 A2 | 4/2005 |
| WO | 20050117390 A1 | 12/2005 |

OTHER PUBLICATIONS

Standard ECMA-267 120 mm DVD—Read-Only Disk, Dec. 1997.

* cited by examiner

*Primary Examiner* — Vivek Srivastava
*Assistant Examiner* — Anthony Brown

(57) ABSTRACT

A content distribution system (300) has access control according to a predefined data access format. A studio (32) provides content data and related proprietary data on a record carrier (34) to be rendered by a rendering device (39). In the system applications (35) are executed on the device for manipulating the content data and related proprietary data. An access policy is set for each studio that controls access to said content data and related proprietary data. According to the invention a cross access policy is set for a virtual entity (42), and at least part of the proprietary data (43) is made available according to the cross access policy of the virtual entity. Also a cross studio application (41) is provided that complies with the access policy of the virtual entity for accessing said data for enabling the rendering device, when rendering the record carrier, to execute the cross studio application for accessing, for a multitude of studios, said at least part of the proprietary data.

11 Claims, 5 Drawing Sheets

SYSTEM FOR MANAGING PROPRIETARY DATA

Figure 1:
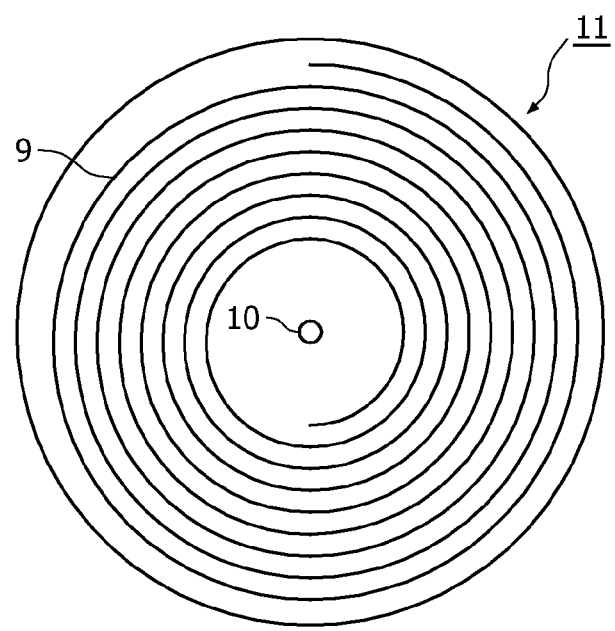

The invention relates to a method for managing proprietary data in a content distribution system having access control according to a predefined data access format, the system comprising at least one studio for providing content data and related proprietary data, a record carrier for carrying the content data and related proprietary data, a rendering device for rendering the content data and related proprietary data, and at least one application for manipulating the content data and related proprietary data, which method comprises the steps of setting an access policy for the studio according to the predefined data access format, the access policy comprising access parameters for controlling access to said content data and related proprietary data, providing at least one studio application complying with the access policy of the respective studio for accessing said data, providing, on the record carrier, content data and related proprietary data according to the access policy of the respective studio, for enabling the rendering device to execute the studio application.

The invention further relates to a computer program product, a rendering device and a record carrier for use in the system. The rendering device comprises read means for retrieving the content data and related proprietary data from the record carrier, rendering means for generating a media signal for rendering the data and related proprietary data, and access control means for executing the studio application. The record carrier comprises the content data and related proprietary data according to the access policy of the respective studio.

The invention relates to the field of providing multimedia and interactive applications in a user device. The interactive applications may include rendering video, games, etc. Commonly such interactive applications are based on stored content data and related proprietary data according to a predefined format. In particular the invention relates to controlling access to such data that is usually provided and owned by a studio.

The document US2004/0148514 describes a rendering system, including a storage medium and reproducing method for rendering stored data of interactive applications on a display, for example video. A reading device, such as an optical disc player, retrieves stored information from a record carrier, for example an audio/video (AV) stream including digitally compressed video data. The document describes various ways of controlling access to data, and implementing an access policy according to a predefined access control format. For example a software publisher (or studio) may provide content data and related proprietary data. Cryptographic methods are described for protecting and controlling access to such data. Digital certificates may be issued by a certification authority to reliably control access, and to validate and accept applications that have been created. The access policy is particularly suited to limit the access to the proprietary data to applications provided by the respective publisher or studio. A studio application is any application that is provided or accepted by a studio. Alternatively, the policy may be used to allow access to the proprietary data for a few, different applications from different publishers which are known beforehand, for example by providing a number of certificates for each of the different applications and for each of the respective publishers.

The known access control systems provide adequate access to proprietary data for applications provided by the respective studio, or distributed under the control of the respective studio. However, there is a problem when at least some proprietary data is to be shared with other applications that are not known beforehand, while still maintaining control over such data.

It is an object of the invention to provide an access control system that allows sharing of proprietary data in an access controlled environment.

For this purpose, according to a first aspect of the invention, the method, as described in the opening paragraph, further comprises the steps of setting a cross access policy for a virtual entity according to the predefined data access format, providing at least part of the proprietary data according to the cross access policy of the virtual entity, providing at least one cross studio application complying with the access policy of the virtual entity for accessing said data, for enabling the rendering device to execute the cross studio application for accessing, for a multitude of studios, said at least part of the proprietary data.

For this purpose, according to a second aspect of the invention, in the device as described in the opening paragraph, the access control means are arranged for executing the cross studio application for accessing, for a multitude of studios, said at least part of the proprietary data.

For this purpose, according to a third aspect of the invention, the record carrier as described in the opening paragraph, comprises said at least part of the proprietary data for enabling the rendering device to execute the cross studio application for accessing, for a multitude of studios, said at least part of the proprietary data.

A cross studio access policy is created for the virtual entity, which policy complies with the predefined access format, and which sets access parameters for controlling access to any content data and/or related proprietary data that a specific studio allows to be shared for cross studio applications, it means applications that relate to data of different studios, for example a catalog or review application. Hence the virtual entity is not a studio, but only allows applications to be created and certified for sharing data across studios. Said providing at least part of the proprietary data according to the cross access policy of the virtual entity includes any way of making available such data, for example by creating an additional copy of such data with adapted access parameters on the record carrier, providing an additional set of access parameters, or providing a dedicated studio application that copies or extracts such data automatically or on request.

The measures have the effect that in the rendering system further applications are made available that are enabled to use, combine, or apply proprietary data for various studios. The further applications do need to comply with the access policy as defined for the virtual entity, hence are still controlled and distributed according to the predefined access format. This has the advantage that proprietary data of various studios is shared via the cross studio application, while still maintaining control and preventing any other studio to access such data.

The invention is also based on the following recognition. Access control formats for controlling access to proprietary data for the proprietor only, or for specific and predefined third parties, is known, for example from US2004/0148514 as discussed above. Also further systems for distributing multimedia content, such as the BD format (Blu-Ray Optical Disc; a description is available on http://www.blu-raydisc.com, and specifically on http://www.blu-raydisc.com/Section-13628/Index.html, while a Section-13890 contains a specification of the Java programming language for BD), and the MHP standard (Digital video Broadcasting Multimedia Home System Specification 1.0.3, ETSI TS 101 812 V1.3.1-2003-06, available from the ETSI website http://www.etsi.org) provide further examples of access control policies. In these examples, the access policies are enforced cryptographically. For example the MHP standard allows permissions to be granted to access files or subdirectories, or to use other resources available in a device. However, such permissions are awarded to known entities only, such as applications provided by the publisher of such data. In addition, known systems allow data to be provided without access control. The inventors have seen that there is a need for an intermediate level of access control that allows sharing of data without losing control, it means to applications that are not yet known, operate on proprietary data of different studios, and are also complying with the access control format. The solution provided is that the virtual entity is established and sanctioned by the studios, which virtual entity is behaving according to the predefined cross access policy. Note that more than one virtual entity may be created, for example by groups of studios having a common interest, or for a specific purpose or subject.

In an embodiment of the method the providing at least part of the proprietary data according to the cross access policy comprises providing, on the record carrier, a subdirectory of a cross application class. By providing a part of the data required to be shared in a dedicated subdirectory, the access policy is set for that specific subdirectory. Advantageously the cross studio application can easily locate and subsequently access the data that a respective studio wants to share. Also the cross studio application may use such a subdirectory to store data to be shared, and subsequently used by the studio applications of the respective studio.

In an embodiment of the method the subdirectory of a cross application class is arranged in at least one of the following ways, having a predefined identifier, such as a subdirectory name, having a predefined, general location, such as in a root directory, or having a predefined, studio dependent, location, such as in a predefined studio directory. Advantageously the cross studio application can easily detect the predefined identifier, or location in the root directory or in the respective studio directory.

In an embodiment of the method the providing at least part of the proprietary data according to the cross access policy comprises providing an application for managing said data in a memory in the rendering device, and/or providing access to proprietary data via a network. The application, provided under control of the studio, may actively create a copy of said at least part of the proprietary data in a memory of a rendering device, or may provide a copy of the data on request, or may acquire said data via the network. This has the advantage that the proprietary data may be further controlled or adapted in dependence of the request of the cross studio application.

Further preferred embodiments of the device and method according to the invention are given in the appended claims, disclosure of which is incorporated herein by reference.

Figure 2:
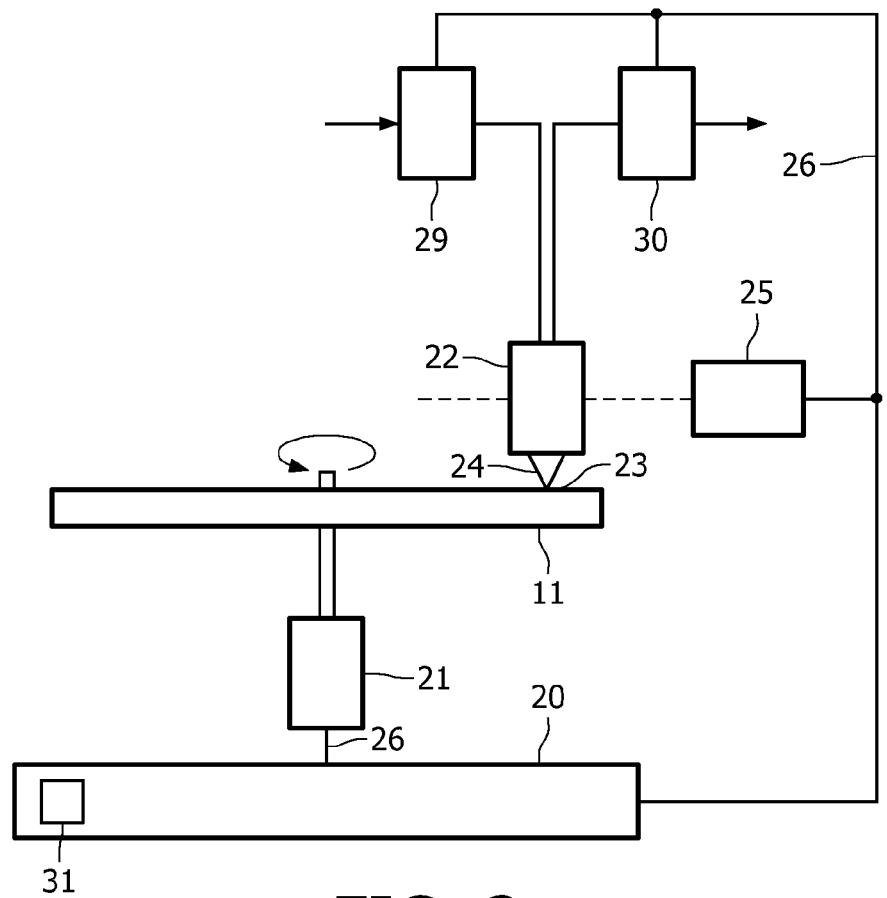
Figure 3:
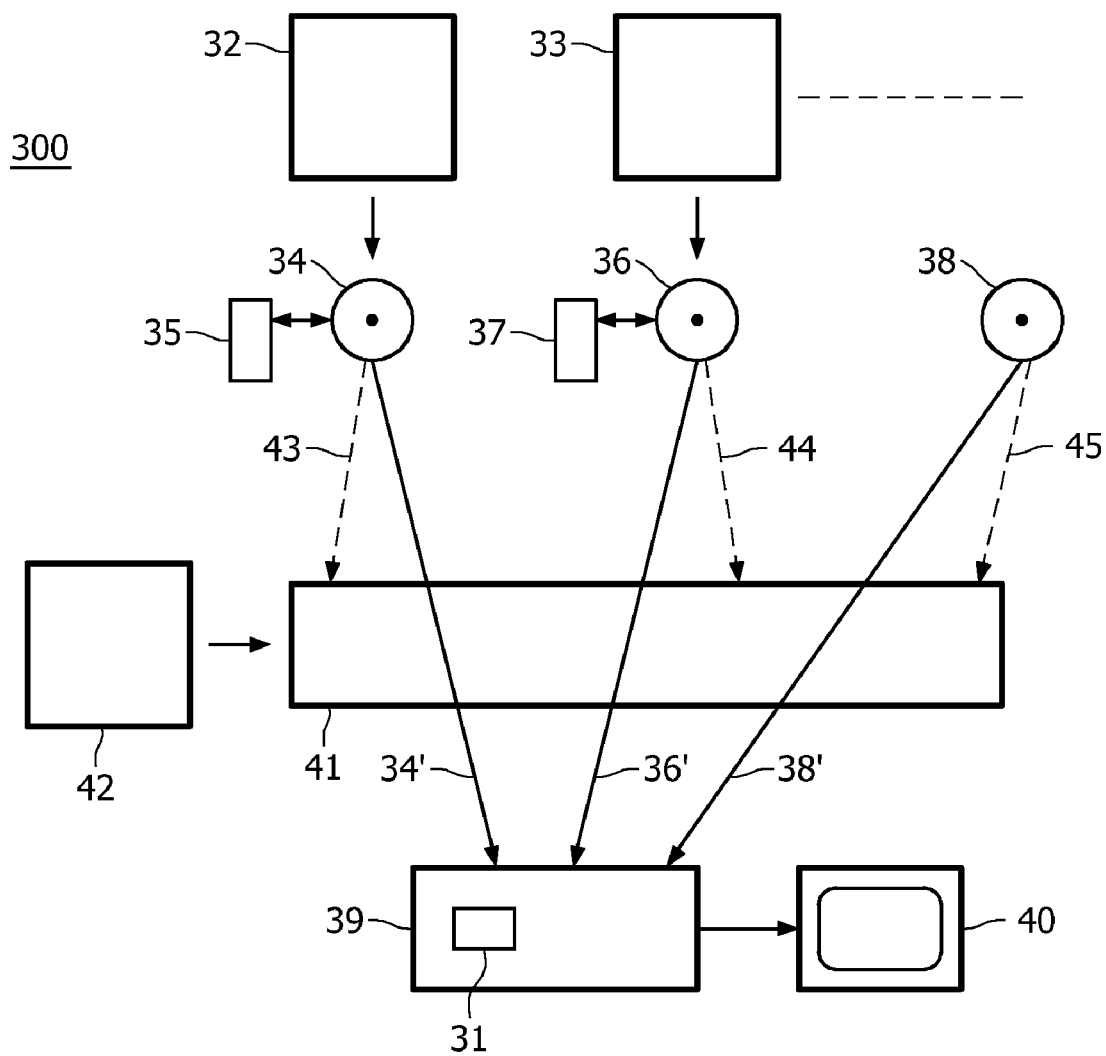
Figure 4:
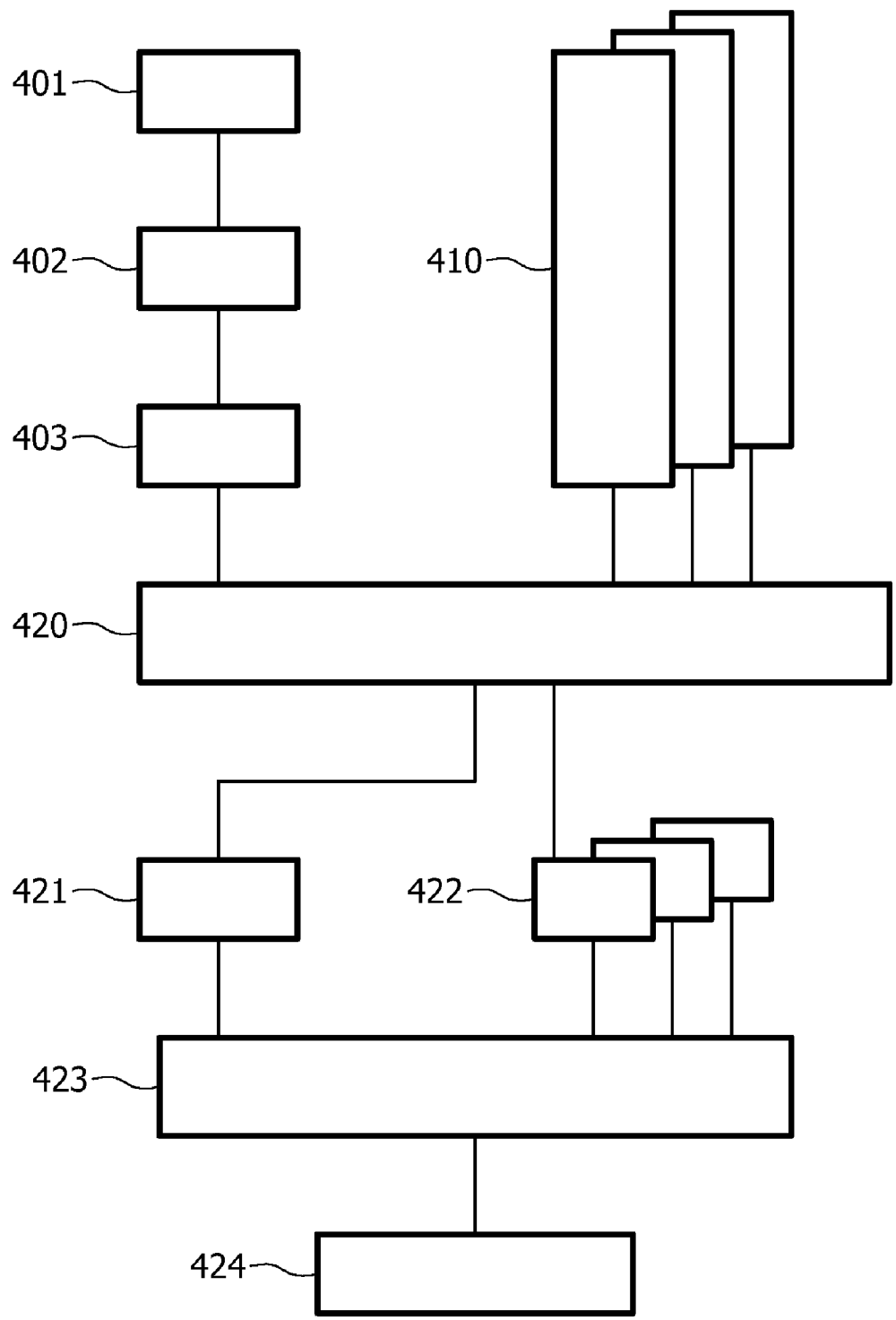
Figure 5A:
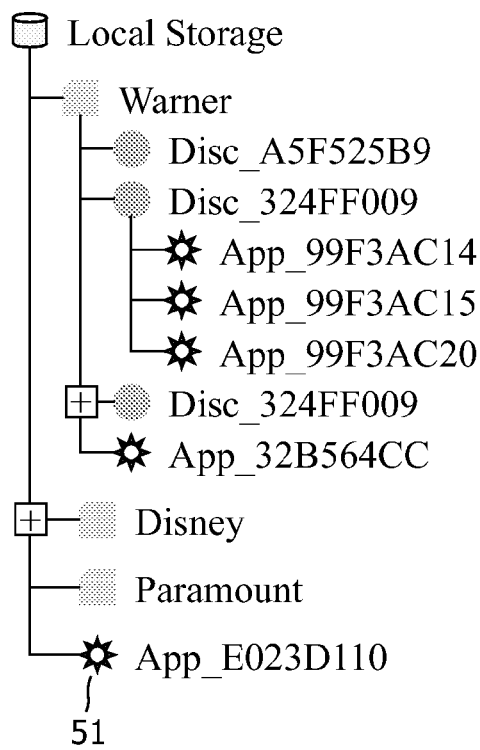
Figure 5B:
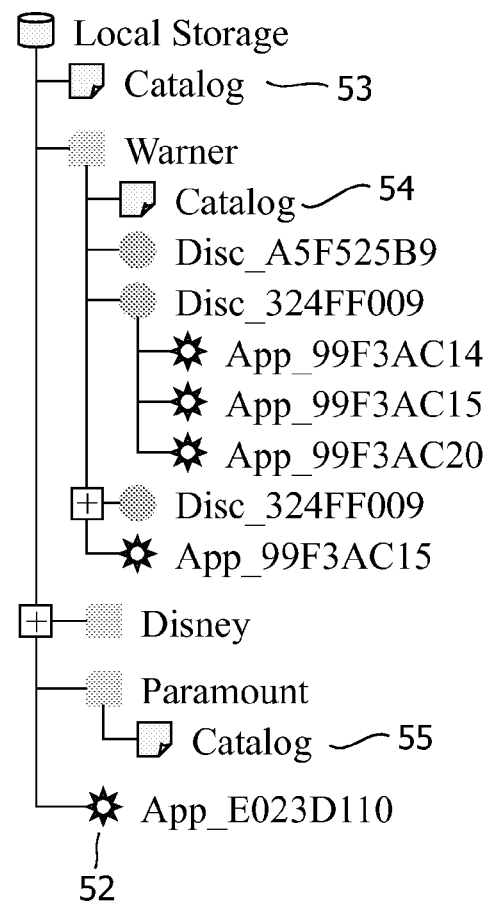
Figure 6:
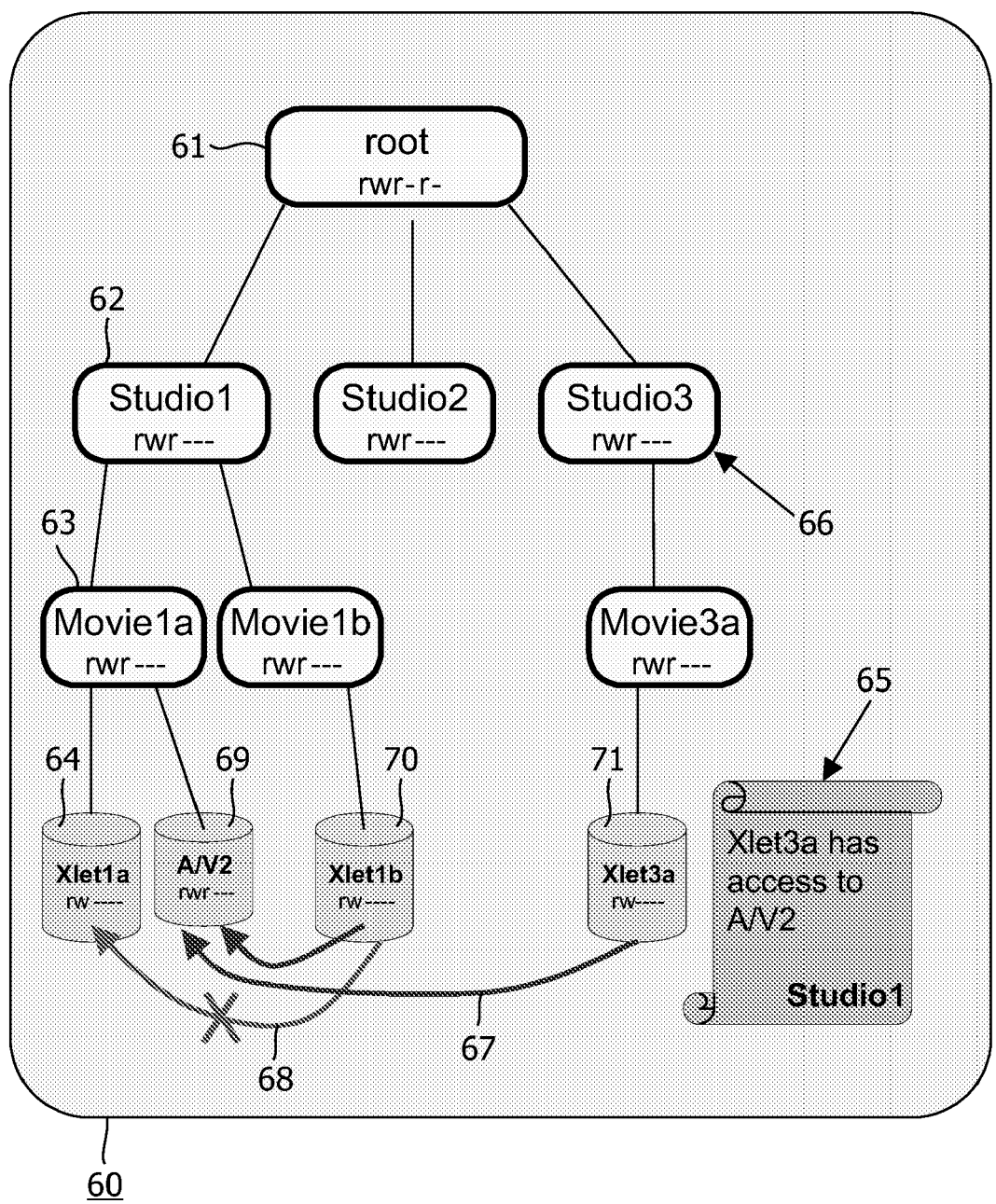

These and other aspects of the invention will be apparent from and elucidated further with reference to the embodiments described by way of example in the following description and with reference to the accompanying drawings, in which FIG. 1 shows a storage medium, FIG. 2 shows a rendering device, FIG. 3 shows a content distribution system having access control according to a predefined data access format, FIG. 4 shows a process of managing proprietary data in a content distribution system, FIG. 5 shows a memory structure having subdirectories, and FIG. 6 shows a file access control mechanism.

Corresponding elements in different Figures have identical reference numerals.

FIG. 1 shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc. Examples of an optical disc are the CD and DVD, and the high density optical disc using a blue laser, called Blu-ray Disc (BD). Further details about the DVD disc can be found in reference: ECMA-267: 120 mm DVD—Read-Only Disc—(1997). The information is represented on the information layer by optically detectable marks along the track.

The record carrier 11 is intended for carrying digital information in blocks under control of a file management system. The information includes real-time information to be reproduced continuously, in particular information representing digitally encoded video like MPEG2 or MPEG4.

In new optical disk standards high definition video may be combined with graphics and applications to create an interactive viewing experience, for example video may be combined with interactive applications to enhance the viewing experience. Typically these applications allow the user to control playback of the video content, get more information on the content being watched or give access to new services. For new services the user devices may have a communication interface for establishing a connection to a network such as the internet. Through this connection the application can, for example, provide e-commerce, gambling and information services on a display device like a television (TV).

The storage medium is carrying content information and related proprietary data according to a predefined data storage format, for example video and related data including virtual objects such as buttons, graphic elements or animations, background information on the content information, additional games or interactive tools, etc. The content data and related proprietary data are provided by a so-called studio, it means the content provider and/or owner. For the studio the data is called proprietary, it means under control and/or in possession of the respective studio. The predefined data storage format allows data to be access controlled, for example by using cryptographic methods, to be available only according to the copyright provisions applicable. The set of rules and parameters created for the specific studio, according to a predefined data access format, is called an access policy.

FIG. 2 shows a rendering device for reproducing real-time information and active information. The device has read means, which include a head 22 for retrieving the stored information, and scanning means for scanning a track of the record carrier 11 as described above. The scanning means include a drive unit 21 for rotating the record carrier 11, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, for example a laser diode. The head further comprises (not shown) a focusing actuator for moving the focus of the radiation beam 24 along the optical axis of said beam and a tracking actuator for fine positioning the spot 23 in a radial direction on the center of the track.

The control unit 20 is connected via control lines 26, for example a system bus, to other units that are to be controlled. The control unit 20 comprises control circuitry, for example a microprocessor, a program memory and control gates, for performing the procedures and functions according to the invention as described below. The control unit 20 may also be implemented as a state machine in logic circuits.

For reading the radiation reflected by the information layer is detected by a detector of a usual type, for example a four-quadrant diode, in the head 22 for generating a read signal and further detector signals including a tracking error and a focusing error signal for controlling said tracking and focusing actuators. The read signal is processed by a rendering unit 30 for rendering the stored information and generating a display signal for displaying the stored information and accessing virtual objects in the stored information on a display like a computer monitor or TV set. The displaying includes displaying and executing the virtual objects, for example buttons invoking commands in an interactive user interface or animations during reproducing real-time information.

According to the invention the device has an access control unit 31 for executing applications. Applications are functions made available on the rendering device, usually by a studio via software. Applications may also be provided by different sources, for example the manufacturer of the rendering device, or a general purpose type of application by an independent software company. The specific function of the access control unit 31 according to the invention is executing studio applications and so-called cross studio applications, which is elucidated further below with reference to FIG. 3. It is noted that the applications, parts of applications or related functions may be implemented as resident functions in the access control unit. Alternatively, the applications may be provided on the record carrier, via a further information carrier or via a network, for example the internet The access control unit 31 may be implemented as a software function in the control unit 20, as part of the rendering unit 30, or as a separate unit.

The device may be arranged for writing information on a record carrier 11 of a type, which is writable or re-writable, for example DVD+RW or BD-RW. The device then comprises a write unit 29 for processing the input information to generate a write signal to drive the head 22.

In an embodiment of the rendering system the rendering device may retrieve content data and related proprietary data from a remote source. The rendering device at the user location may be connectable via a network to a server. The user device, for example a set top box (STB), has a receiver for receiving broadcast data such as video. The user device has a network interface, for example a modem, for connecting the device to a network, for example the internet A server also has a network interface for connecting the server device to the network. It is noted that user devices that are connectible to a network also include multimedia devices (for example a standardized multimedia home system MHP), enhanced mobile phones, personal digital assistants, etc.

FIG. 3 shows a content distribution system having access control according to a predefined data access format. The system 300 has a first studio 32 for providing first content data and related proprietary data, a second studio 33 for providing second content data and related proprietary data. For distributing content the system further has a first record carrier 34 for carrying the first content data and the first proprietary data, and a second record carrier 36 for carrying the second content data and the second proprietary data. Alternatively, the content data and/or the proprietary data may be distributed by a different channel, for example a network such as the internet The first studio 32 may also provide at least one studio application 35 for manipulating the first content data and related proprietary data. The second studio 33 may also provide at least one studio application 37 for manipulating the corresponding second data.

A rendering device 39 is provided for rendering the content data and related proprietary data from the record carriers, as indicated by the arrows 34', 36' and 38'. The rendering device may be coupled to a display 40. In an embodiment, the rendering device 39 is coupled to a network via a network interface (not shown in FIG. 3) and may receive the content data and/or the related proprietary data via the network. The applications are also effectively executed in the rendering device. The applications may be initially included in the rendering device, or may be distributed separately, for example via the network, and stored in the rendering device. It is noted that the record carriers are for carrying the content data and related proprietary data, but may also carry the applications.

Each studio has a respective access policy, it means a set of parameters and rules according to the predefined access control format. The first studio application 35 is able to access the first proprietary data according to a first access policy, and the second studio application 37 is able to access the second proprietary data.

It is noted that the system can be extended by further studios each having respective proprietary data, and corresponding further record carriers 38 and/or applications, while each studio will usually have a number of sets of proprietary data (for example movie productions and corresponding extras for users), while each set (production) is multiplied commercially on a number of record carriers.

According to the invention a cross access policy is created for a virtual entity 42 according to the predefined data access format. Each studio accommodates providing at least part of the proprietary data 43, 44, 45 according to the cross access policy of the virtual entity 42 as indicated by the dashed arrows. Access control is provided to at least one cross studio application 41 that is complying with the access policy of the virtual entity 42 for accessing said data. By applying one of the record carriers 34,36,38, and the applications, to the rendering device 39 the device is able to execute the cross studio application 41 for accessing, for a multitude of studios, said at least part of the proprietary data 43,44,45.

FIG. 4 shows a process of managing proprietary data in a content distribution system. The system has been described with respect to FIG. 3. The method comprises the following steps. It is noted that the steps may be repeated, or may be executed in a different order, where appropriate. In a first step 401 an access policy for the studio is set according to the predefined data access format. The access policy has access parameters for controlling access to said content data and related proprietary data. In a second step 402 at least one studio application is provided complying with the access policy of the respective studio for accessing said data. In a third step 403 a record carrier is manufactured, which contains the content data and related proprietary data according to the access policy of the respective studio. In a next step the record carrier is applied to the rendering device, which is now enabled to execute the studio application. A similar sequence of steps 410 is performed for a further studio.

As next step the method further comprises the step 420 of creating a virtual entity and setting a corresponding cross access policy according to the predefined data access format. In step 421 for the first studio, at least part of the proprietary data according to the cross access policy of the virtual entity is made available. Similarly in step 422 data of the further studio is made available. In a step 423 at least one cross studio application is provided complying with the access policy of the virtual entity for accessing said data. Finally, in step 424, the rendering device is enabled, when rendering the record carrier, to execute the cross studio application and to access, for a multitude of studios, said at least part of the proprietary data.

FIG. 5 shows memory structure having subdirectories. The memory structure may be embedded on a local storage unit in a playback device, for example a hard disk or solid state memory. The Figure schematically shows on the left a first memory structure 51 that has subdirectories for a number of studios, for example Warner, Disney and Paramount. Each subdirectory is access controlled based on the access policy for the respective studio. In each subdirectory further subdirectories may be present that relate to specific productions or record carriers of s studio, for example Disc_A5F525B9 for Warner. The Figure on the right shows a second memory structure 52 that has the same subdirectories for a number of studios.

In addition, a number of subdirectories are provided according to a cross access policy. In a first example a subdirectory 53 named Catalog is shown in a root directory of the local storage. Alternatively, or additionally, at least one further subdirectory 54, 55, named Catalog, is shown in a directory of the specific studio. Note that this directory is access controlled according to the cross access policy, it means may be accessed by any application that is provided via the virtual entity.

The Figure shows a subdirectory of a cross application class to have a predefined identifier, such as a specific subdirectory name, or to have a predefined, general location, such as in a root directory, or to have a predefined, studio dependent, location, in a predefined studio directory.

It is noted that such subdirectories accommodate part of the proprietary data of the respective production, or productions, of a studio. Such data may initially be distributed on the respective record carrier, or separately via a network like the internet, and may be copied to the local storage.

Note that all data on a disc from a specific studio are under the control of applications from that studio only with the possible exception of some applications native to the rendering device. The intention of the access control is to prevent that other studios have random access to that data and manipulate it to their own advantage. To that end all data on local storage tied to discs from a specific studio are stored in a subdirectory of that studio as shown in first structure 51 in FIG. 5. File access to data in a studios subdirectory is only granted to applications of that studio. Applications are signed by the studio and are verified to be of that studio by evaluating the certificate of the application. A security manager, it means a function native to the player, sets file permissions such that studio signed applications, and only those, have access to the subdirectory of that studio.

In some cases, for example in the case a catalogue is to be build across all discs of all studios, applications not of a certain studio need access to data inherently controlled by that studio. As explained a special permission type, called cross access, is created for certain classes of applications, called a cross application class, that need access to proprietary data from more then one studio. A corresponding virtual entity is introduced that has the purpose to be able to grant access permissions to the cross studio application class subdirectories. The access is not granted based on allegiance to a studio, but based on the possession of a credential for a specific directory because the application qualifies for that credential on the account of that it is of a the cross access type, and adheres to given rules for the predefined access control format. Hence the access policy of the virtual entity comprises providing granting permissions for the cross studio application to access specific proprietary data, the permissions being based on the cross studio application qualifying to adhere to predefined rules.

A first example is a specific credential for a review subdirectory, in the storage of a specific studio, to be written to by certified review applications. This credential can be defined for directly referencing the respective subdirectory, or the studio may create a credential by proxy. For example access to root:\warner\review is granted to the review application from the virtual entity. Any application that can show it belongs to that category gets access to all that is defined for the review application, including access to root: \warner\review.

A second example is to create, for each studio, a studio subdirectory accessible according to the cross access policy. Each of the studio subdirectories has a subdirectory for general data, shielded from other studios but accessible for a video manager application (VM in a player) also if no disc is in the player. This subdirectory may be used to store catalogue data to enable an overview of all record carriers seen by the player. A studio may put any data it allows to be copied in this directory by placing it in a catalogue directory on the disc. Alternatively, the studio can also choose to refrain from using the catalogue subdirectory on disc and/or provide its own studio application to copy any required proprietary data to the catalogue subdirectory in the player. It is noted that proprietary data like the catalogue data or further additional data may be distributed via a network like the internet The cross studio application may then access the proprietary data via the network, for example when a record carrier of that studio is played.

Any data placed in a subdirectory named "catalog" in FIG. 5 will be accessible by generic applications of the cross application class. If the catalogue directory is a subdirectory of a studio directory, only that studio can write to that directory. The collection catalogue program of the player can read the data. The cataloguer application may be resident code that automatically scans new discs for standardized meta data. This studio proprietary data is copied into the catalogue subdirectory of the studio. If the studio wishes it can make extra proprietary data available by placing it in a catalogue subdirectory on the record carrier for automatic transfer. Alternatively a studio application may copy such data to the player memory. Generic meta data maybe copied to the catalogue subdirectory in the root. No studio can touch it there but only the resident code of the player unless explicitly granted to do so.

A further example is a summary application, which creates a short summary of a video production, for example by extracting key scenes and fragments. The summary application may also organize summaries of different video programs from different studios according to certain criteria or subjects. The studio may allow access to specific data to enable such summary applications to function effectively.

FIG. 6 shows a file access control mechanism. The Figure schematically shows a file system 60, having a root directory 61 and studio subdirectories 62 for a number of studios. Each studio may have further movie subdirectories 63 for a number of movies. In each directory files may be present, for example in subdirectory 63 "movie 1a" an audio video file 69 and an application file 64 called "Xlet1a", and in further subdirectories an application 70 called "Xlet1b" and an application 71 called "Xlet3a". Each subdirectory or file has permission indicators 66, for example "UNIX permissions", that indicate the rights to read and write for different users that access the subdirectory. According to the data access format each application has a credential 65, which is an additional amount of data (usually in a separate file) that indicates the access rights, and may contain access parameters, for accessing proprietary information. Note that application 70 (Xlet1b) gets read-access to file 69 (A/V2, which has group read access), but it is not allowed to start application 64 (Xlet1a which only has movie owner-access) as indicated by arrow 68. Application 71 (Xlet3a) is not in the same group (Studio1) as application 64 (Xlet1a) and file 69 (A/V2) so it needs a special credential 65, signed for example by Studio1, to get access to file 69 (A/V2) as indicated by arrow 67.

An embodiment of the data access format as shown in FIG. 6 is based on JAVA and may be used in a Blu-ray Disc ROM Full Feature Mode. Such BD-ROM players include a Java-Virtual Machine (JVM), which can run small applications (programs usually called Xlets). These flexible and powerful rendering machines may also have network connections and may have local storage in the form of a Hard Disc Drive (HDD). The content owner, it means studio, can distribute the applications and meta data together with the movie on the BD-ROM disc or via a network connection. Here, studio applications and meta data are examples of proprietary data. In the standard access control of such system only the original application that stores any access parameters in a protected memory location (also called putting rights into a Key Locker) can retrieve them.

The cross access policy may accommodate certain consumer expectations and studio business models. Three examples of applications are:

different 3rd party developers (with different application IDs) may develop applications for a studio; the studio will want them to share their associated A/V-content.

studios may give other studios access to some of their usage rights, for example to allow applications to make catalogues of content etc.

native Java code (it means installed in the player as part of the JVM by the manufacturer) may need to be given access to the A/V-content of a studio.

The data access format according to MHP (see above reference) is a subset and extension of Java, to enable running of Java Xlets on Set-top Boxes (STB) for the purpose of browsing, interaction with A/V-data etc. When an application is loaded it is first authenticated by the system. The system subsequently treats the application as a user (based on "application_id") on the system (similar to the Unix operating system), with a home directory, a group to which it belongs ("organization_id"). The application comes with access parameters according to the access policy (called a Permission Request File), through which it requests certain resources from the system (network access, etc.), which may be granted depending on the access policy file.

The data access format subsequently uses these features to define a two-layered access structure to data stored on local storage of the rendering device:

1. Unix-style permission rights: (or default policy) data is stored as files in a normal directory tree. Every file and directory is endowed with read/write access-permissions 66 for each level (see MHP, section 12.6.2.7.2):
a. application (the application that created the data)
b. organization (the applications that belong to the same organization as the creating application).
c. world (all applications)
2. Credential-Mechanism: to override the above mechanism and provide more fine-grained access, the owner of a file (s)/directory can prepare a Credential 65, which is a (signed) statement that another application (for example from another group) can access such file(s)/directory. The Credential 65 is contained in the Permission Request File mentioned above. Upon loading the application, the system may decide, based on the Credential and the policy files that the application should get access to additional files (see MHP, section 12.6.2.6). The above directory/file access control mechanism may be used for a record carrier like BD-ROM. In that case "application_id" corresponds to the applications associated with a particular disc, and "organization_id" corresponds with a Studio.

For the cross studio applications a virtual entity having a cross access policy is created as described above. The cross studio applications (3rd party) could reside either in a particular directory under the outsourcing Studio, or have their own subdirectories, depending on the level of trust between studio and contractor and the level of control desired by the studio. In the latter scenario, the Credential-based access mechanism can still allow the studio to make its content available to the cross access application. Similarly native Java code (1st option in section above), not associated with any studio, can be given access to studio content with a proper credential based on the cross access policy.

It is noted that the access control unit 31 that provides the access control functions as described above, may be provided by a computer program product for executing in a user device. The program is operative to cause a processor of the standard user device, for example a laptop computer, to perform the steps of manipulating the proprietary data according to the access control format. The application may be distributed as a software plug-in, for example via internet, on a record carrier, or send via the broadcast together with any other applications and audio/video content. When loaded the software provides the applications so these access the proprietary data according to the access policy.

Although the invention has been explained mainly by embodiments based on optical discs other storage media may be applied also. Note however that the invention particularly relates to security policies with respect to data provided by a studio on a user's rendering device. Each studio may be granted an amount of local storage to store data relevant for that studio. The access policy for that data is that only applications that are verified to be from that studio have access to that data. For example permissions may be granted using the Java language. An application has a permission request file that is compared to the parameter files of the access policy. If a requested permission is allowed by the access policy, the respective resource is released to the application. The cross studio application is granted access to specific proprietary data, for example in a subdirectory with a specific name. The virtual entity will certify all cross studio applications which require access according to the respective cross access policy.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. Method for managing proprietary data in a content distribution system having access control according to a predefined data access format, the system comprising
at least one studio for providing content data and related proprietary data, a record carrier for carrying the content data and related proprietary data, a rendering device for rendering the content data and related proprietary data from the record carrier, and at least one application for manipulating the content data and related proprietary data, which method comprises the steps of setting an access policy for the studio according to the predefined data access format, the access policy comprising access parameters for controlling access to said content data and related proprietary data, providing at least one studio application complying with the access policy of the respective studio for accessing said data, providing, on the record carrier, content data and related proprietary data according to the access policy of the respective studio, for enabling the rendering device to execute the at least one studio application, establishing a virtual entity by the at least one studio, setting a cross studio access policy for the virtual entity according to the predefined data access format, which cross studio access policy sets access parameters for controlling access to content data and related proprietary data that a specific studio allows to be shared for cross studio applications, wherein the virtual entity is configured to allow cross-studio applications to be created and certified for sharing data across studios and operates in accordance with the cross studio access policy, providing at least part of the proprietary data according to the cross studio access policy of the virtual entity, providing at least one cross studio application complying with the cross studio access policy of the virtual entity for accessing said proprietary data, executing the at least one cross studio application by the rendering device for accessing said at least part of the proprietary data for a plurality of studios.

2. Method as claimed in claim 1, wherein the providing at least part of the proprietary data according to the cross access policy comprises providing a subdirectory of a cross application class.

3. Method as claimed in claim 2, wherein the subdirectory of a cross application class is arranged in at least one of the following ways:

having a predefined identifier, such as a subdirectory name, having a predefined, general location, such as in a root directory, having a predefined, studio dependent, location, such as in a predefined studio directory.

4. Method as claimed in claim 1, wherein the providing at least part of the proprietary data according to the cross access policy comprises providing an application for managing said data in a memory in the rendering device, and/or providing access to proprietary data via a network.

5. Method as claimed in claim 1, wherein the at least one cross studio application is a catalog application, a review application, or content summary application.

6. Method as claimed in claim 1, wherein the access policy of the virtual entity comprises providing granting permissions for the cross studio application to access specific proprietary data, the permissions being based on the cross studio application qualifying to adhere to predefined rules.

7. Computer program product for accessing, for a multitude of studios, at least part of proprietary data of the studios in a device for rendering data and related proprietary data, which program is operative to cause a processor to perform the cross studio application in the method as claimed in claim 1.

8. Device for rendering content data and related proprietary data for use in a content distribution system having access control according to a predefined data access format, the system further comprising at least one studio for providing content data and related proprietary data, a record carrier for carrying the content data and related proprietary data, and at least one application for manipulating the content data and related proprietary data, and the system being arranged for setting an access policy for the studio according to the predefined data access format, the access policy comprising access parameters for controlling access to said content data and related proprietary data, providing at least one studio application complying with the access policy of the respective studio for accessing said data, providing, on the record carrier, content data and related proprietary data according to the access policy of the respective studio, which device comprises read means for retrieving the content data and related proprietary data from the record carrier, rendering means for generating a media signal for rendering the data and related proprietary data, access control means for executing the studio application, wherein the system is arranged for establishing a virtual entity by the at least one studio, setting a cross studio access policy for the virtual entity according to the predefined data access format, which cross studio access policy sets access parameters for controlling access to content data and related proprietary data that a specific studio allows to be shared for cross studio applications, wherein the virtual entity is configured to allow cross-studio applications to be created and certified for sharing data across studios and operates in accordance with the cross studio access policy, providing at least part of the proprietary data according to the cross access policy of the virtual entity, providing at least one cross studio application complying with the access policy of the virtual entity for accessing said data, and wherein, in the device, the access control means (31) are arranged for executing the cross studio application for accessing, for a multitude of studios, said at least part of the proprietary data.

9. Device as claimed in claim 8, wherein the access control means (31) are arranged for executing a resident cross studio application, in a particular case a collection catalogue application.

10. Record carrier carrying content data and related proprietary data for use in a content distribution system having access control according to a predefined data access format, the system further comprising at least one studio for providing content data and related proprietary data, a rendering device for rendering the content data and related proprietary data from the record carrier, and at least one application for manipulating the content data and related proprietary data, and the system being arranged for setting an access policy for the studio according to the predefined data access format, the access policy comprising access parameters for controlling access to said content data and related proprietary data, and providing at least one studio application complying with the access policy of the respective studio for accessing said data, the record carrier comprising the content data and related proprietary data according to the access policy of the respective studio, wherein the system is further arranged for establishing a virtual entity by the at least one studio, setting a cross studio access policy for the virtual entity according to the predefined data access format, which cross studio access policy sets access parameters for controlling access to content data and related proprietary data that a specific studio allows to be shared for cross studio applications, wherein the virtual entity is configured to allow cross-studio applications to be created and certified for sharing data across studios and operates in accordance with the cross studio access policy, providing at least one cross studio application complying with the access policy of the virtual entity for accessing at least part of the proprietary data according to the cross access policy of the virtual entity, and wherein the record carrier comprises said at least part of the proprietary data for enabling the rendering device to execute the cross studio application for accessing, for a multitude of studios, said at least part of the proprietary data.

11. Record carrier as claimed in claim 10, wherein the record carrier comprises said at least part of the proprietary data in a subdirectory of a cross application class, or comprises an application for managing said data in a memory in the rendering device.

* * * * *